United States Patent

Grandgirard

[15] 3,638,605

[45] Feb. 1, 1972

[54] FABRICATION OF PRINTED CIRCUITS

[72] Inventor: Pierre J. Grandgirard, Livry-Gargan, France

[73] Assignee: Societe Industrielle Bull-General Electric (Societe Anonyme), Paris, France

[22] Filed: June 3, 1970

[21] Appl. No.: 42,943

[30] Foreign Application Priority Data

June 5, 1968 France ....................69I8464

[52] U.S. Cl. ....................118/50.1, 34/68, 118/66, 118/423, 118/643

[51] Int. Cl. ....................B05c 11/00

[58] Field of Search ....................118/641, 642, 643, 66, 67, 118/423, 424, 50, 50.1; 34/17, 18, 68; 117/93.3, 93, 119.6

[56] References Cited

UNITED STATES PATENTS

| | | | |
|---|---|---|---|
| 545,429 | 8/1895 | Lewis | 118/423 |
| 856,996 | 6/1907 | Custer et al. | 118/423 |
| 1,141,930 | 6/1915 | Buch | 118/423 X |
| 2,203,241 | 6/1940 | Waldron | 118/50 |
| 2,266,392 | 12/1941 | Durant et al. | 118/643 X |
| 2,389,586 | 11/1945 | Andrews | 34/68 |
| 2,390,007 | 11/1945 | Sherman | 118/63 X |
| 2,724,191 | 11/1955 | Kahn et al. | 34/68 |
| 2,889,806 | 6/1959 | Conant | 118/643 |
| 3,060,057 | 10/1962 | Johnson | 118/641 X |
| 3,259,557 | 7/1966 | Smith et al. | 118/50 UX |

*Primary Examiner*—Morris Kaplan
*Attorney*—Ronald J. Reiling and Fred Jacob

[57] ABSTRACT

An assemblage for lacquering metallized boards provided with metallized holes therethrough, wherein, in a dustproof enclosure each board is first dehydrated by heating, lowered vertically into a tank of lacquer, moved through the lacquer in a direction perpendicular to the plane of the board, raised vertically from the tank, and passed through a drying chamber. Said drying chamber includes a lacquer setting chamber having a hot air feed therein and surmounted thereon a drying passageway including radiant and convection-type heaters.

6 Claims, 4 Drawing Figures

INVENTOR
Pierre J. Grandgerard

BY

ATTORNEY

INVENTOR

Pierre J. Grandguiard

BY

ATTORNEY

FABRICATION OF PRINTED CIRCUITS

BACKGROUND OF THE INVENTION

This invention relates to improvements in the fabrication of printed circuits and, more particularly, concerns improvements in an apparatus to practice the process termed "lacquering" of metallized boards.

In this process, boards of insulating material bearing one or more metallic layers on their faces and sometimes traversed by internally metallized holes, must be coated with a layer of photosensitive lacquer, by immersion in a bath of lacquer, and then dried. Each board is thereby rendered suitable for receiving, by exposure to strong actinic light, the photographic image of the metallized parts which, after an appropriate treatment, must remain on the board to constitute the various parts of electric circuits. The other metallized parts of the board are destroyed in the course of such treatment. For good success, the process of lacquering depends in large part on the results of subsequent operations, especially when the circuit boards are traversed by metallized holes through which electrical coupling can be provided between separated circuits on the various faces of one or more united boards. These holes can also receive pluggable circuit elements, which may be soldered.

In order to lacquer a printed circuit board, it is plunged into a bath of lacquer from which it is removed more or less rapidly. It is known that the thickness of the lacquer retained on the two faces of a board depends on the viscosity of the lacquer and on the speed with which the board is removed from the bath. Moreover, the uniformity of the thickness of the lacquer layer depends greatly on the conditions under which the lacquer is fixed and dried on the board.

Skilled operators succeed easily enough in properly lacquering such board units, if the boards are not perforated. However, the presence of holes in a board to be lacquered creates numerous problems which are particularly difficult to overcome, especially when the problem is to lacquer boards before producing relatively "dense" printed circuits; i.e., circuits in which the width of the "reserved" conductive strips, as well as the spacing between different parts of the circuit are, for example, of the order of three-tenths of a millimeter, as is current practice.

When a board provided with metallized holes, of which the diameter frequently is less than a millimeter, is plunged vertically into a bath of lacquer, very often air remains trapped in the holes by the lacquer. When the thin layer of lacquer which temporarily obstructs the openings of the holes gives way, the interior surface of the holes is found not to be covered by the lacquer and will not be protected in the course of subsequent operations, which may provide one cause for rejecting the finished boards. In order to remedy these disadvantages, it has been recommended to plunge the boards flat into the lacquer bath for expelling the air contained in the holes, than to rock the board and withdrawing it vertically from the bath in order to equalize the thickness of the lacquer on the two faces. However, if this operation, when properly accomplished, is not followed by a timely operation of hardening of the lacquer and then by a sufficient drying, "runs" of the lacquer may occur at different points on the boards, particularly around the openings of the holes. These "runs," as will be described later, may also provide cause for rejecting finished boards.

In order to remedy the defects appearing after lacquering, as a result of the presence of holes in the boards, certain manufacturers have proposed carefully plugging these holes with an appropriate protective material before the lacquering. This plugging is a slow and delicate operation, because after plugging the holes the metallized faces of the boards must not bear any traces of the protective material, which is usually not photosensitive. It will be shown hereinafter that the instant invention permits the obtaining of satisfactory results by avoiding such an operation.

It is known also that fingerprints on the boards or dust incorporated into the lacquer during the various steps may similarly provide causes for rejecting the boards. Finally bubbles of air imprisoned in the lacquer, which burst in the course of drying to leave parts not covered by the lacquer, provide cause for rejection.

Therefore, the object of the present invention is to remedy these disadvantages; i.e., to permit regularly obtaining boards covered with a uniform layer of lacquer of predetermined thickness, wherein the metallized holes are well protected internally, wherein there are no "runs" and wherein the thickness of the ridges of lacquer which form around the openings of the holes are reduced to well-defined dimensions.

SUMMARY OF THE INVENTION

In a lacquering assemblage realized in accordance with the instant invention, the operation of lacquering boards is effected entirely automatically with protection from dust and without manual contact. Such operation permits assembling the optimum conditions for realizing constantly lacquered boards presenting well-defined characteristics and for virtually eliminating the causes for rejection in fabrication which can develop from defects in the process of lacquering. One installation pursuant to the invention comprises principally a dehydration chamber with heating means in its upper portion, and a drying chamber provided with surface and internal heating means. The two chambers are disposed vertically and side by side, above a tank containing photosensitive lacquer. The level, temperature, and viscosity of the lacquer are maintained constant. Transport and fixing means is provided to hold each board vertically and for lowering the board into the dehydration chamber wherein the board is first heated with dry air then returned to the ambient temperature, for lowering the board into the tank of lacquer, for displacing the board perpendicularly, to its plane at the end of its descent movement, and then for raising the board during which it first emerges from the tank and then enters into the drying chamber. The velocity imparted to the board by the transport means is determined in accordance with the thickness of lacquer which must be retained on the faces of the board.

BRIEF DESCRIPTION OF THE DRAWING

The invention will be described with reference to the accompanying drawing, wherein.

DESCRIPTION OF THE PREFERRED EMBODIMENT

Figure 1:
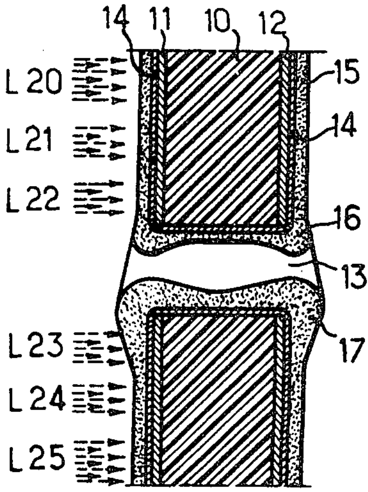
FIG. 1 is a cross-sectional view, in large scale, of a portion of a lacquered board with metallized holes, taken on the section 1—1 of the completed board portion shown in FIG. 2.

The portion of the board shown in FIG. 1 comprises a sheet of insulating material 10 which has been plated on its two faces with sheets of metal 11 and 12. After its perforation by holes 13, the board then has been entirely covered, including the interior walls of the holes, with an adherent metallic layer 14. Layer 14 has been deposited first in part by a chemical process and then has been increased in thickness by an electrolytic process. The different layers of metal covering a board are generally constituted of copper.

After pumicing and a suitable cleaning of the metallized board, it receives on its two faces and in the interior of the holes a layer of photosensitive lacquer 15. In the course of the operation of lacquering and of drying of the lacquer, ridges of lacquer form around the openings of the holes. The thickness of a ridge is normally small, as shown at 16 in FIG. 1, but it may be increased as shown at 17 and thereby present certain disadvantages. In order to better demonstrate by comparison the inherent disadvantages of the presence of a ridge of excessive thickness, the two cases have been represented on the same figure.

Figure 2:
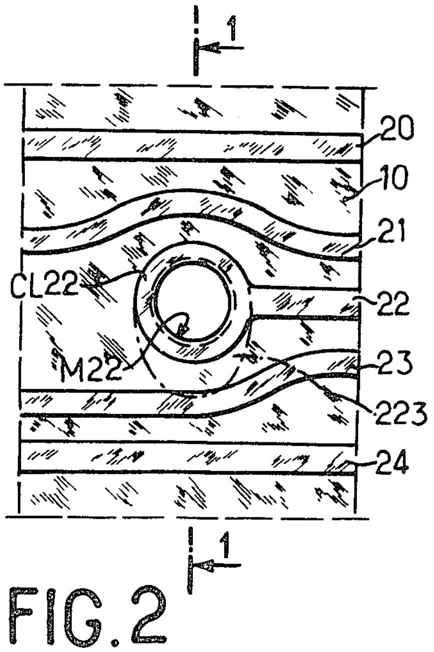
FIG. 2 is a view of one face of the completed board corresponding to the lacquered portion shown in the section of FIG. 1.

Once suitably lacquered and dried each board receives, preferably simultaneously on its two faces, a photographic image that determines the parts of the metallic layer covering the board which are to be "reserved" in the course of subsequent treatments to form the circuit parts. The parts not so "reserved" are destroyed by an appropriate chemical treatment. FIG. 2 shows a portion of a completed board where there only remain, after treatment of the metallic layer the conductive strips 20–24. In FIG. 1, each group of small arrows L20–L25 represents the width of a light beam projected onto the face of a board through an appropriate mask (not shown), which provides that the lacquer which must protect the conductive bands 20–24 is not exposed to light. Light beams L22 and L23 illuminate the periphery of the surface corresponding to a reserved part comprising a conductor 22 and a collar CL22, which extends around a hole 13 covered internally with a metallized portion M22, FIG. 2. A photographic image is applied similarly to the other face of the board for determining the reserved parts corresponding either to other circuits or to circuits extending over the two faces by the intermediary of metallized holes. The lacquer coating the interior of the holes is not exposed to the light. In the course of the subsequent treatment, the lacquer portions exposed to the light are dissolved by a known process in order to expose the metallized portions, which will be removed subsequently by chemical attack.

It is to be noted relative to FIG. 1, that the portion of the board illuminated by the light beam L22 is covered with a layer of lacquer of normal thickness. When a run of lacquer is produced, as represented on the lower half of hole 13, the lacquer which is illuminated by light beam L23 presents a thickness which varies between 1.5 and 2.5 times the normal thickness of the lacquer layer. In this situation, the lacquer existing at this location on the face of the metallic layer is only weakly exposed by the light which it receives through an excessive thickness of lacquer. Under normal conditions of treatment of the board, lacquer which has been either not exposed or only slightly exposed to the light remains on the board, preventing the chemical attack on the protected metal. Thus, a metallized portion remains, for example in zone 223 (bounded in FIG. 2 by a dashed line) presenting the danger of electrically connecting the reserved collar CL22 surrounding the hole with the neighboring strip 23. This type of defect, requires retouching the circuits, always a delicate operation, and sometimes leading to the rejection of the finished boards when such defect appears at too many places. An assemblage in accordance with the invention and represented schematically in FIGS. 3 and 4, permits virtually remedying all of these difficulties.

Figure 3:
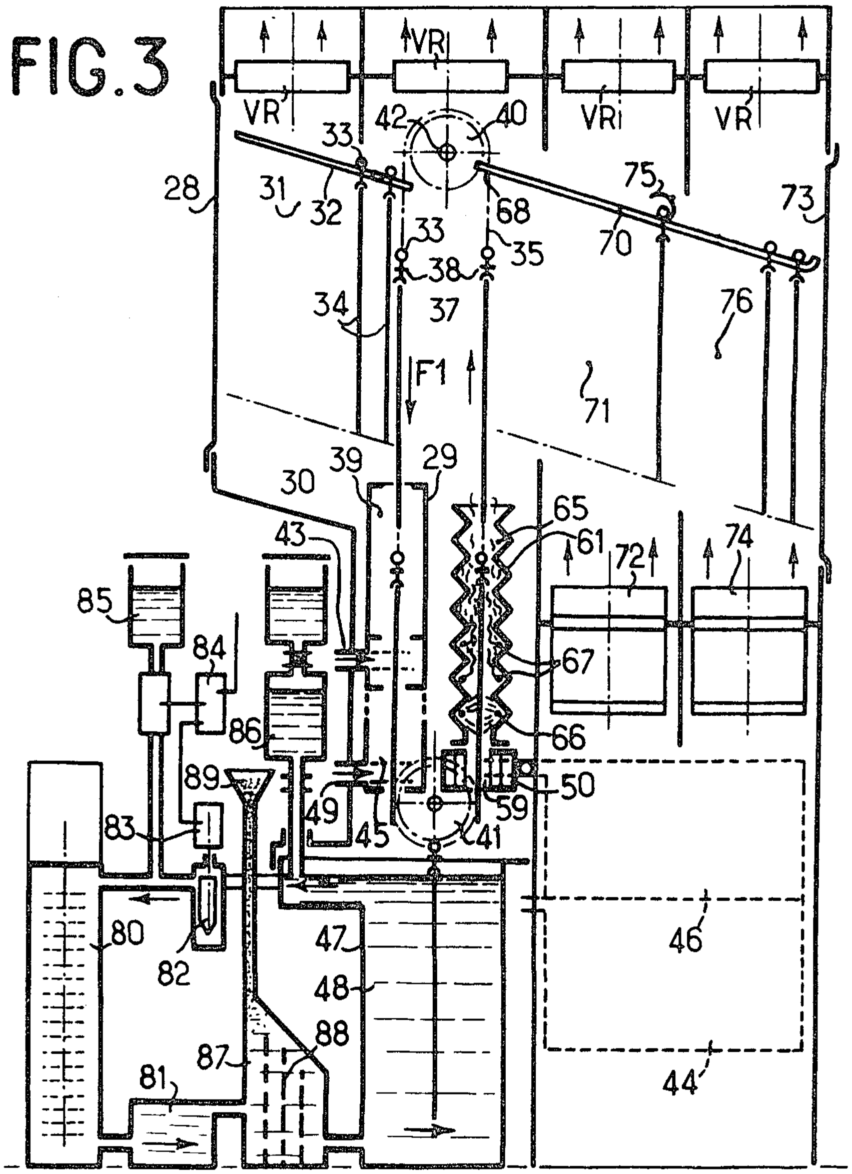
FIG. 3 is a cross-sectional view illustrating schematically an arrangement of the principle elements of a lacquering assemblage provided in accordance with the invention.

The principal parts of the assemblage are contained, FIG. 3, in an enclosure 30 and comprise a receiving station, a station for dehydration, lacquering and drying, a station for finishing drying, and a discharging station. Each of these stations is provided at its upper part with a recovery ventilator VR disposed for evacuating the air containing solvent vapors and preventing the entry of dust into the installation. The receiving station 31 comprises inclined support rails 32, each disposed for receiving one end of support bars 33. Each support bar 33 is provided with hanging means for suspending a board for lacquering 34. These bars move by gravity to proximate endless chains 35 and 36 of a conveyor mechanism 37. Each of chains 35 and 36 is provided with hanger members 38, and can receive at the most the support bars of five boards. The devices for transferring bars 33 from rails 32 of the receiving station to conveyor mechanism 37 and then for transferring bars 33 to the rails 70 of the discharging station can be realized in substantially different manners according to known techniques; however, since these devices are not the principal object of the invention they are not described in detail herein.

Metallized boards 34, after having been cleaned and manually attached to support bars 33, are introduced into receiving station 31 through an entrance 28 and are placed on the inclined support rails 32. The endless chains 35 and 36 of conveyor mechanism 37 are parallel and each extends vertically between two toothed wheels 40 and 41. Wheels 40 are mounted on a motor shaft 42 which is driven by a motor, not shown. The speed of rotation of such motor can be regulated, such as for imparting to chains 35 and 36 a translation motion of the order of 6 centimeters per minute. At the time of the passage of a hanger member 38 of chains 35 and 36 in front of rails 32, a support bar 33 with its board is transferred to the chains and is then lowered vertically, as shown by arrow F1.

The board is then introduced progressively into the upper part 39 of a dehydration chamber 29. During its passage through chamber 29, the board is heated on its two faces by a current of dried air heated to 40° C. and arriving through a conduit 43 which is coupled to a hot air generator 44. The dehydration board then advances into the lower portion 45 of chamber 29 where it is restored to the ambient temperature by a current of dried and filtered air arriving through a conduit 49.

The board is then progressively lowered into a tank 47 containing photosensitive lacquer 48, termed "Photoresist," of which there is known several commercial varieties which qualify for use herein by having very close characteristics for this purpose. Toward the end of the descent of the board into tank 47, it is driven with a semicircular motion perpendicular to its plane as a consequence of the passage of conveyor chains 35 and 36 around wheels 41. With this motion, the air which may have remained trapped in the metallized holes of the board at the time of its immersion in the lacquer bath, is expelled from the holes and replaced by the lacquer. This expulsion is due to the pressure difference produced between the two faces of the board as a result of its motion in a direction perpendicular to its plane. The board then emerges progressively from the tank, with a vertical motion at a velocity of translation of the chains 35 and 36, which velocity depends, at least in part, on the thickness of lacquer which is to be retained on the two faces of the board.

After moving a distance outside of the lacquer, of which the duration is determined by the spacing between the level of the lacquer and the position of the drying chamber 61, the board is introduced into a lacquer setting chamber 50 (FIGS. 3 and 4), in which the two faces of the board are subjected for a predetermined time to the action of a current of dry air, filtered and heated to about 65° C. This hot air is provided by a generator 46, similar to generator 44, at a controllable rate of flow and temperature.

Figure 4:
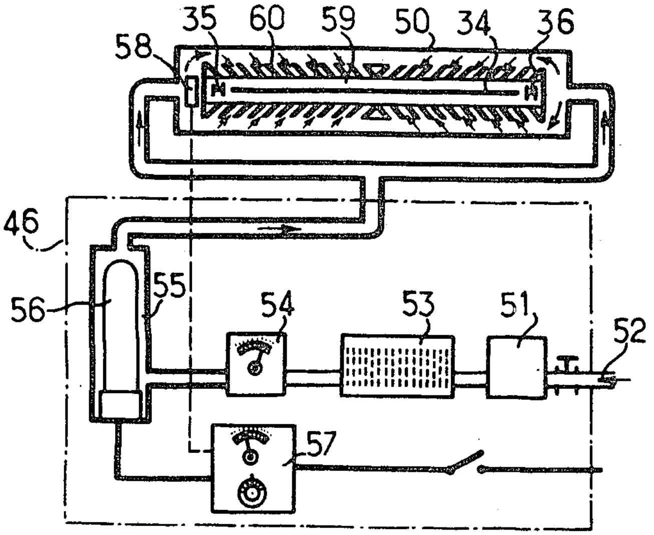
FIG. 4 is a horizontal section taken through the lacquer setting chamber shown in vertical section in FIG. 3, and an arrangement of various elements of a generator of hot air.

Generator 46, FIG. 4, comprises a pressure reducer 51 coupled on its one side to a compressed air inlet 52 and on its other side to an air filter 53. The filtered air passes into a flowmeter 54, which indicates at all times the rate of flow of air that is transmitted to an air heater 55. Heater 55 comprises a heating element 56, supplied with electric current through the intermediary of a heat regulator 57. Regulator 57 is connected to a thermometrical capsule 58, which controls the temperature of the air arriving at lacquer setting chamber 50.

FIG. 4 also shows a horizontal section through lacquer setting chamber 50. Chamber 50 comprises a central passageway 59, through which passes boards 34 and conveyor chains 35 and 36. On each side of the boards, lacquer setting chamber 50 is provided with fixed foils 60, oriented for conducting the hot air obliquely to the surface of the boards and spaced apart so as to provide an optimal distribution of the hot air at the surface of the boards. The time and the manner in which each part of the board is subjected to the action of the hot air, after it emerges from the bath, are determined for regularity of the layer of lacquer on the board and the formation of the ridges of the lacquer around the openings of the holes.

From the exit of lacquer setting chamber 50, the board is raised gradually into a vertical passageway 65, FIG. 3, wherein two undulating walls form a succession of chambers separated in part from each other by the constrictions of the passageway. In a first chamber, disposed on both sides of the path of the board, are two elements 66 for emitting an intense infrared radiation to heat the lacquer in depth by absorption of this radiation, without, however, exposing the photosensitive lacquer. In the chambers situated above these infrared radiation elements are placed four heating elements 67, which furnish only by convection the heat necessary for the complete stabilization of the lacquer at a temperature of about 65° C.

After a board has emerged entirely from vertical passageway 65 it is brought by conveyor 37 to a transfer location 68, where support bars 33 are transferred from hanger members 38 of chains 35 and 36 to the inclined support rails 70. On rails 70 each board transverses an oven 71, in which it is subjected for at least 5 minutes to the action of a current of hot air at 65° C. provided by a blowing generator 72, under the control of a release mechanism 75, which is actuated each time that the hanger members of the conveyor chains pass transfer location 68. Emerging from oven 71, each board passes into discharging station 76, where it is returned to the ambient temperature by a blower 74. After complete cooling and hardening of the lacquer, the boarus are removed from the assemblage through an exit 73.

One lacquering assemblage such as that which has been described can lacquer continuously boards of 68×35 centimeters containing metallized holes. The process takes about 50 minutes for each board and the boards may be loaded in series of three or four.

In an automatic lacquering assemblage it is necessary that the viscosity, the temperature, the purity and the level of the lacquer in the tank be maintained constant. It is known that dust in suspension in the lacquer forms a screen, arresting and diffusing the light in the thickness of the lacquer at the time of exposure of the boards. Therefore, it is important that the operation of lacquering be entirely performed with protection from dust and that the lacquer applied to the boards not be polluted by dust brought into the assemblage, for example, by the boards to be lacquered. In addition to all the precautions taken for this purpose, a continuous circulation of the lacquer is maintained in the tank by a pump-filter assembly 80, which pumps the lacquer at the level of the surface of the bath, from the side of introduction of the boards into the tank. The lacquer is subsequently returned to the tank toward its lower portion, after passing through a regulated heater 81, which holds the temperature of the lacquer in the vicinity of the ambient temperature, and after passing through a reservoir 87, provided, preferably, with perforated plates 88. Plates 88 are particularly adapted for trapping the bubbles of air in suspension in the lacquer and for evacuating them through a vent 89.

The viscosity of the lacquer is controlled continuously by an arrangement comprising a small agitator 82, inserted into the path of the lacquer emerging from the tank. This agitator is driven by a small motor 83, wherein the supply current varies as a function of the viscosity of the lacquer, which is normally about 0.09 poise at 20° C. A testing device 84, measures the intensity of the supply current to the motor and controls periodically, according to this current, the injection of a predetermined quantity of solvent 85. The pump-filter 80, provides an intimate mixture of the lacquer and the solvent after the latter's introduction. A reservoir 86, filled with lacquer periodically, is adapted for providing a virtually constant level of the lacquer in the tank.

It is evident that the example of the assemblage which has been described by way of illustrating a preferred form of realization of the invention is not in any way limiting and that various modifications of detail and of form may be made to the arrangements described without departing from the scope of the invention.

I claim:

1. A lacquering assemblage for the fabrication of printed circuits in which boards of insulating material, bearing one or more metallized layers and provided with metallized holes, must be coated with a photosensitive lacquer by immersion in a bath and then dried for later processing, said assemblage comprising; a dehydration chamber having heating means in its upper portion; a drying chamber provided with surface and internal heating means; said two chambers being disposed vertically and side by side above a tank containing photosensitive lacquer of which the level, the temperature and the viscosity are maintained substantially constant; and transport means arranged for holding a board vertically and for lowering said board into said dehydration chamber wherein said board is first heated by dry air and then returned to the ambient temperature, then for lowering said board into said tank of lacquer, for displacing said board perpendicularly to its plane at the end of its descent movement, then for raising said board in the course of which it first emerges from said tank, then enters into said drying chamber at a velocity determined in accordance with the thickness of the lacquer required to be retained on the faces of said board said drying chamber comprising in its lower portion a lacquer setting chamber having therein means to deliver filtered dry air, at a temperature of substantially 65° C., onto the two faces of a board emerging from said tank of lacquer, said setting chamber being surmounted with a vertical passageway having two undulating walls forming a succession of smaller chambers separated in part from each other by constrictions of said passageway, and wherein in said smaller chambers are disposed elements emitting infrared rays for heating the lacquer in depth and heating elements for heating said lacquer through convection.

2. The lacquering assemblage of claim 1, wherein said transport means comprises a conveyor mechanism having two endless conveyor chains parallel, each chain extending vertically between two toothed wheels of which at least one is driven by a motor shaft, said mechanism providing for a board to be suspended, by one end thereof, to said mechanism, and for said board to be lowered for introduction into said tank, then to be driven with a motion of semicircular translation corresponding to the lowest portion of its path through the lacquer tank, and then to be driven upwardly to emerge from said tank.

3. The lacquering assemblage of claim 2, further comprising a receiving station, said receiving station comprising inclined support rails on which are placed bars, each grasping a board and adapted to be hung and driven successively by hanger members affixed to the conveyor chains of said conveyor mechanism.

4. The lacquering assemblage of claim 3, further comprising a discharging station, said discharging station comprising inclined support rails to which said bars grasping said boards are transferred successively from said conveyor mechanism, then displaced into an oven in which circulates a current of dry air heated to substantially 65° C., and then advanced into a current of air at the ambient temperature.

5. The lacquering assemblage of claim 1, wherein said lacquer setting chamber is provided with fixed foils oriented for conducting hot air obliquely to the surface of said boards and spaced apart so as to provide an optimal distribution of said hot air at the surface of said boards.

6. The lacquering installation of claim 1, wherein said tank is provided with pumping and filtering means adapted for withdrawing said lacquer at the level of the surface of said bath and for returning said lacquer toward the lower portion of said bath through the intermediary of a reservoir provided with means adapted for trapping the bubbles of air in suspension in the lacquer and for evacuating said bubbles through a vent.

* * * * *

UNITED STATES PATENT OFFICE
CERTIFICATE OF CORRECTION

Patent No. 3,638,605 Dated February 1, 1972

Inventor(s) Pierre J. Grandgirard

It is certified that error appears in the above-identified patent and that said Letters Patent are hereby corrected as shown below:

On the cover sheet [73] Assignee: "Societe Industrielle Bull-General Electric (Societe Anonyme), Paris, France" should read -- Societe Industrielle Honeywell Bull, Paris, France -- .

Signed and sealed this 14th day of November 1972.

(SEAL)
Attest:

EDWARD M.FLETCHER,JR.
Attesting Officer

ROBERT GOTTSCHALK
Commissioner of Patents